United States Patent [19]

Maeda et al.

[11] 4,282,996

[45] Aug. 11, 1981

[54] METHOD OF CONTINUOUS SLITTING OF FLAT MATERIAL AND APPARATUS THEREFOR

[75] Inventors: Teizo Maeda, 30-12, Kohinata-2-chome, Bunkyo-ku, Tokyo; Masao Murakawa, 215, Misono-cho, Kodairo-shi, Tokyo, both of Japan

[73] Assignees: Teizo Maeda; Masao Murakawa; Nishimori Kogyo Co., Ltd., Osaka, all of Japan

[21] Appl. No.: 766,006

[22] Filed: Feb. 7, 1977

[30] Foreign Application Priority Data

Feb. 9, 1976 [JP] Japan .................... 51/12401

[51] Int. Cl.³ .................... B26F 3/00; B23D 19/06
[52] U.S. Cl. .................... 225/2; 29/413; 83/108; 83/884; 83/887; 225/96
[58] Field of Search .................... 225/2, 3, 96, 96.5; 83/7, 8, 9, 51, 25, 108, 863–865, 887; 29/413

[56] References Cited

U.S. PATENT DOCUMENTS

| 244,827 | 2/1880 | Hewitt | 83/51 |
| 2,053,375 | 9/1936 | Nicholas | 83/9 X |
| 3,641,853 | 2/1972 | Jungbeck | 83/51 X |
| 4,109,500 | 8/1978 | Franek | 225/2 |

FOREIGN PATENT DOCUMENTS 502628 5/1954 Canada .................... 29/413

Primary Examiner—J. M. Meister
Attorney, Agent, or Firm—Armstrong, Nikaido, Marmelstein & Kubovcik

[57] ABSTRACT

A method and apparatus for continuous cold cutting or slitting of a flat material wherein the flat material is subjected to a first step of partial-shearing or penetration in a zigzag state to a controlled depth of penetration, and subsequently to a second step of flattening, thus forcing the penetration formed in the material back to substantially the original thickness of the material, thereby to perform complete severing or slitting the material having no burrs formed during the operation. The first working action is obtained from feeding of the flat material into the controlled spacing of opposing pairs of cutter discs so that there occurs partially shearing or penetration in the flat material under an optimally predetermined interfering action by the opposing pairs of cutter discs into the material when it engages therewith. The second working action is obtained from the insertion of thus partially-sheared or penetrated material into the spacing optimally predetermined between an opposing pair of rolls having a flat cylindrical surface so that there occurs flattening action by the opposing pair of rolls over the both surfaces of the material when engaged therewith. The cutter discs and flattening rolls are controllably driven in synchronism.

18 Claims, 27 Drawing Figures

CRACKING THROUGH

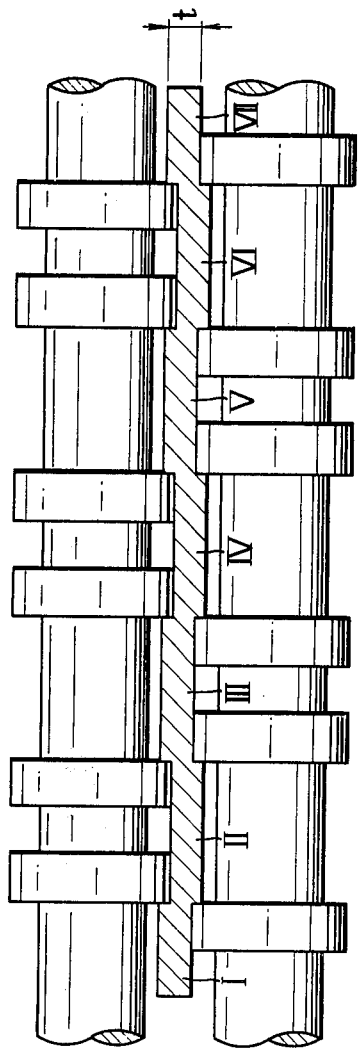
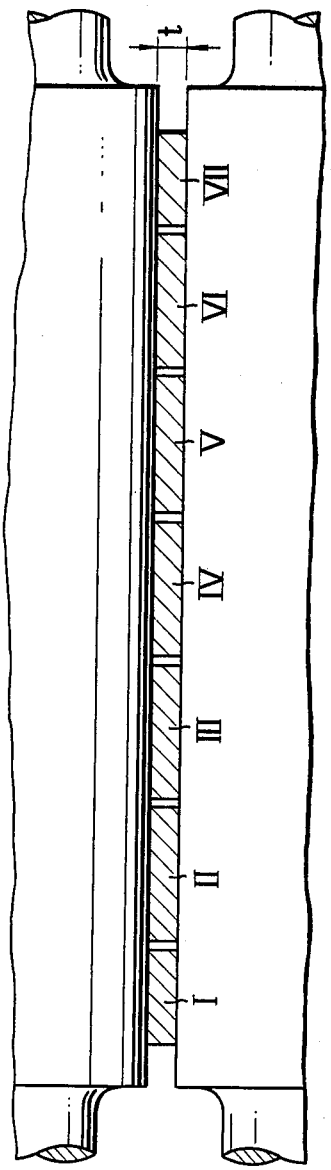
FIG. 5A
FIG. 5B

SHEAR'G FORCES & END POINTS DURING 1st STEP
(CUTTER DIA - 150mm; DRIVE-CUTTING; t = 1mm)
CLEARANCE 0% REL. TO THICK.

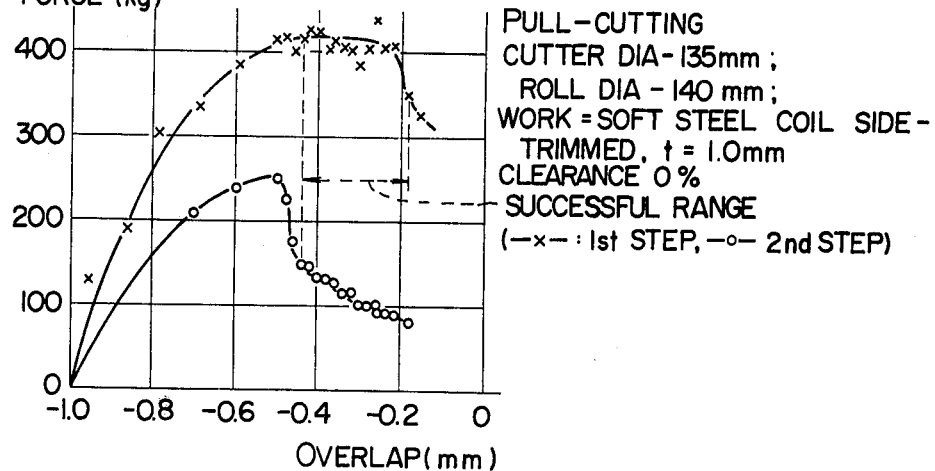
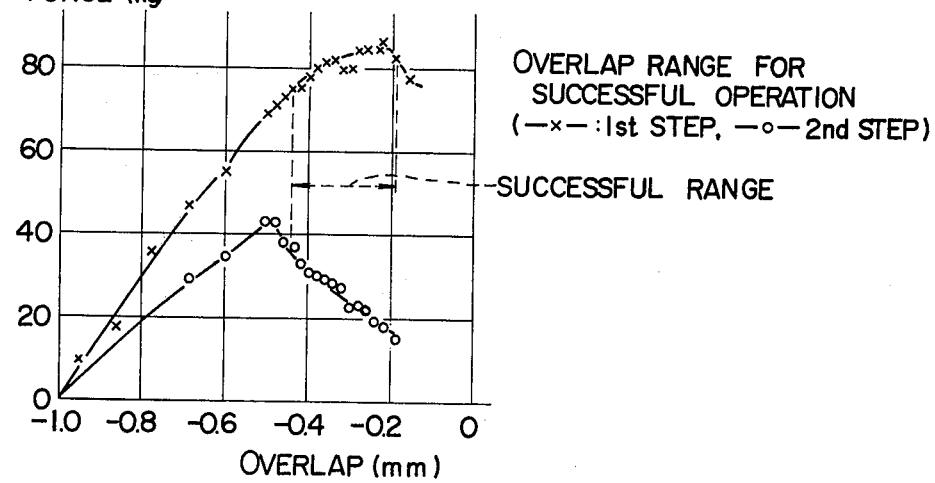

EFFECT OF CLEARANCE VALUE (C)
(CUTTER DIA - 150 mm; IN DRIVE-CUT ON SOFT STEEL t = 1 mm)

REMARKS = ⊙ GOOD END FACE
○ FAIR END FACE
△ POOR END FACE
× BAD END FACE (NORMAL SLIT END FACE)
※ UNSUCCEEDED AREA

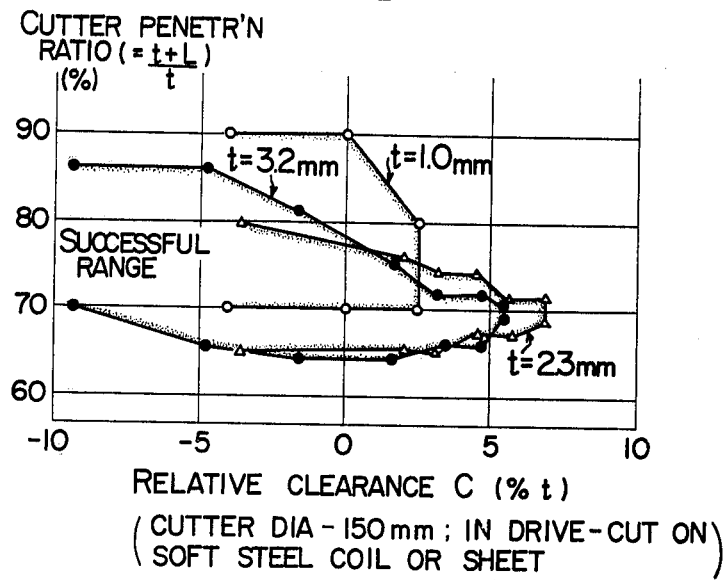

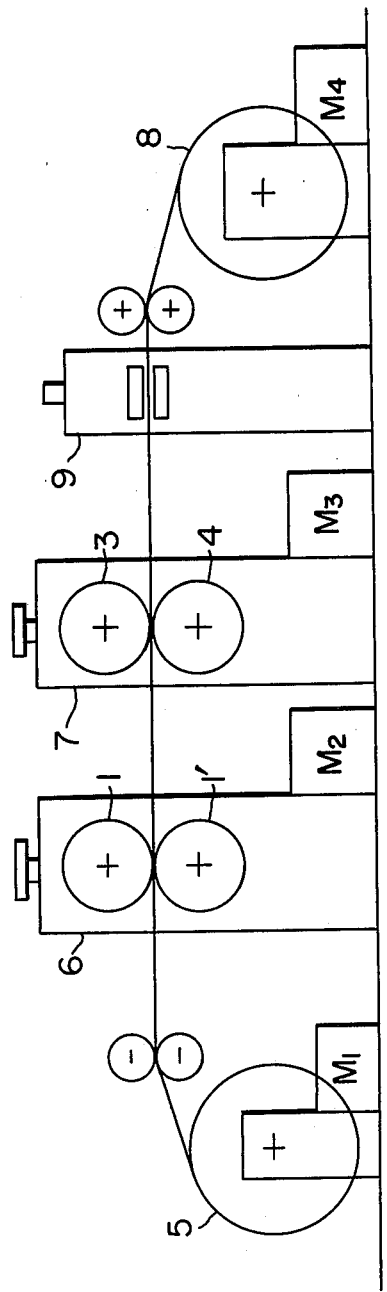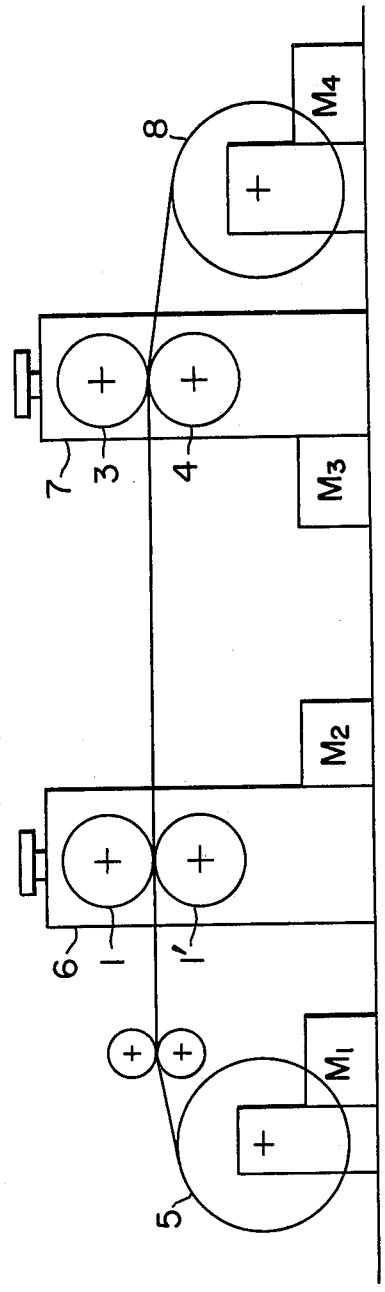

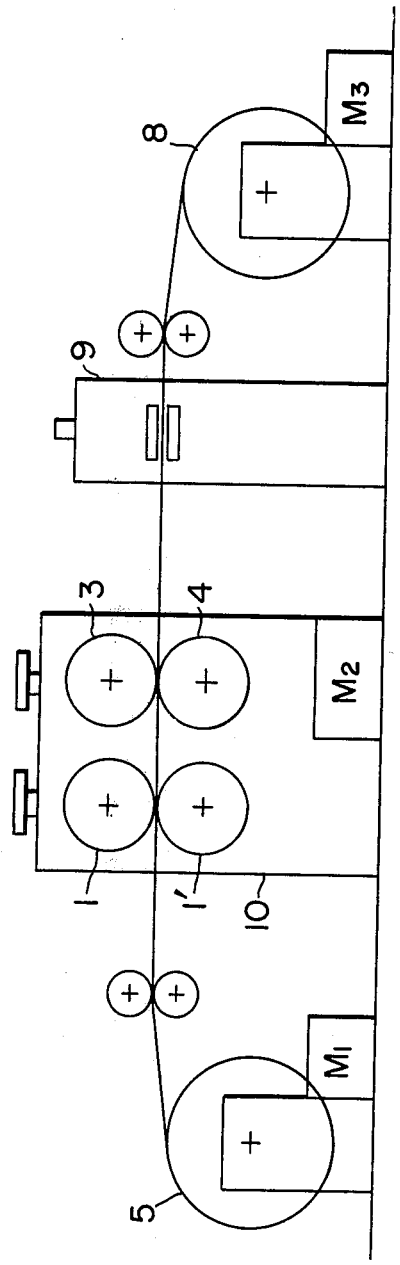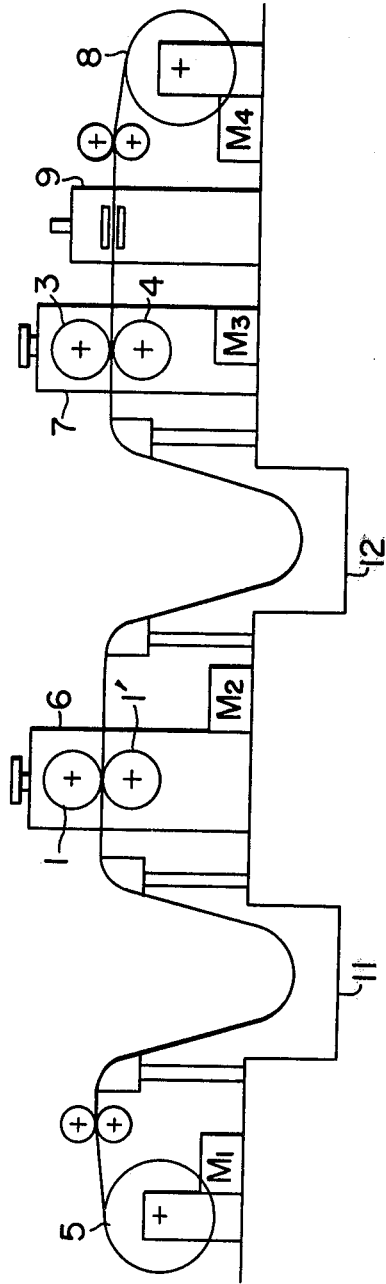

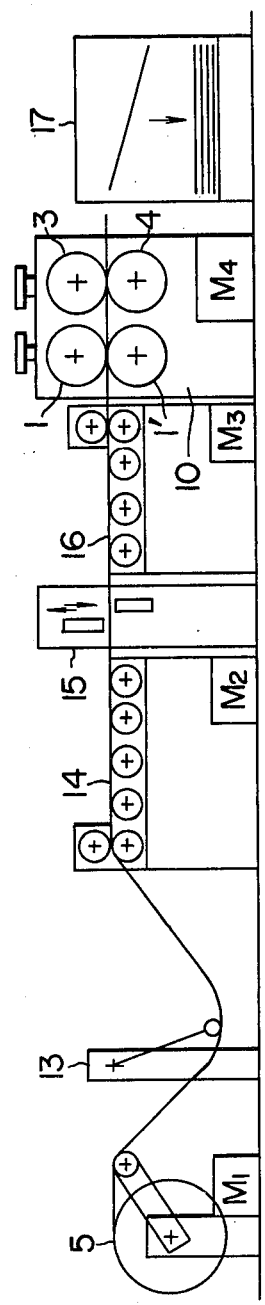
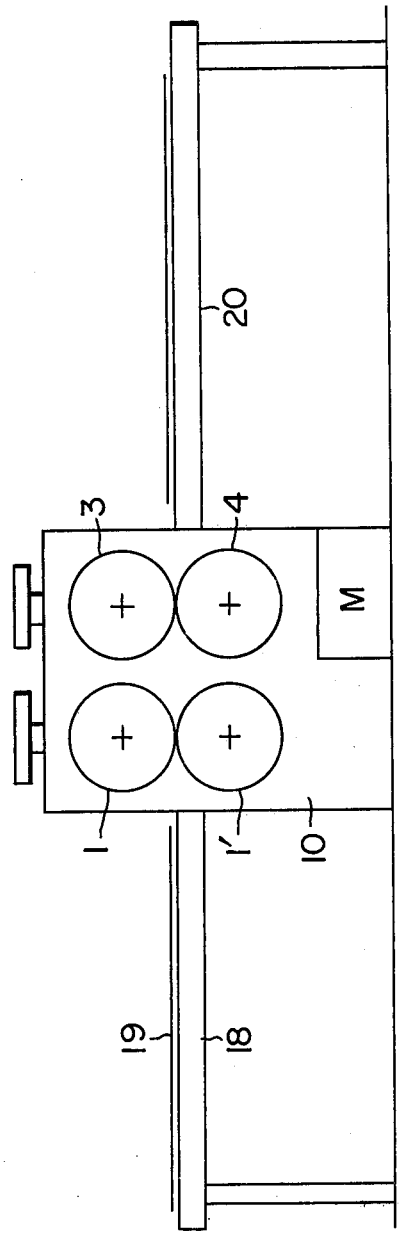

METHOD OF CONTINUOUS SLITTING OF FLAT MATERIAL AND APPARATUS THEREFOR

The present invention relates in general to a method and an apparatus for a cutting of a flat rolled material, and more particularly to a method and an apparatus for the cold cutting or slitting of a flat material, a coil stock, or a coiled sheet material of a standard wide breadth free from any burrs formed during the slitting operation.

Recently there have further increasingly been applied in the mass scale production of various mechanical elements utilizing a coil stock a variety of plastic working methods such as blanking, bending, deep drawing, or the like. As a consequence, the overall consumption of such coiled strips or coil stock as applied to such plastic working has been increasing rapidly.

In coping with such background of increasing demands for coiled strips or coil stock, of iron, steel, non-ferrous metals, plastic resins and the like, there have been introduced a variety of cutting machines for cutting or slitting a multiplicity of strips of specific widths from, for instance, a raw coil stock having the standard wide breadth according to the requirements of clients, one of the most common among which is a slitting machine. Also, in the production of the raw coil stock having the standard wide breadth, there have been provided a side trimmer, which is also a kind of slitting machine, for the purpose of trimming up the uneven or undesired irregularities on the lateral edge surfaces of the coil stock. When cutting or slitting operations are conducted on such coiled strips or coil stock, it is essentially required from the quality control viewpoint to maintain the irregularities so-called "burrs" to a minimum level for obtaining a satisfactory finish or trimming on the lateral edge surfaces of such a coil stock. This is because since such burrs as being formed during the cutting or slitting operations of the coil stock to a plurality of elongated strips would turn out to be of a sharp knife-like edge shape and with a certain hardness due to working hardening, they would possibly hurt the operators of such coil stock during handling, or they would possibly damage the adjacent coil stock surfaces in contact therewith during transportation or in storage. While processing, these burrs would come into contact with the varied mechanical components such as tension pads, etc. of the slitting machine, resulting in a damage or breakage of such components. Besides, when applying a soft covering such as a layer of plastic resin on and around thus formed strips in order to obtain a covered or sheathed product, thus applied material of covering would be damaged by the burrs at the lateral edge surfaces of the split products. In view of such defects or dangers disadvantageously effected by the burrs of the coil stock, it has long been one of the greatest concerns in the manufacture of such coil stock as to how to eliminate or prevent such burrs from occurring. In coping with such requirements, there have been proposed a variety of approaches to give satisfactory solutions on the problems rendered by such burrs. One of such approaches to remove in a certain manner thus formed burrs, thereby to prevent such damage or danger stated above, some of which is, for instance, realized by smashing or squeezing the burrs by using compressive force of a press roll, and by smoothing-out operation on the slit product lateral edge surfaces by using a shaving cutter or the like. However, by way of the former process of smashing burrs, it is practically impossible to completely remove the burrs from the lateral edge surfaces of the slit products, and further it would possibly a hamper subsequent procedures, such that a smooth and compact rolling of the slit product is improperly disturbed, etc. While the latter process of smoothing-out the burrs by using such as a shaving cutter would theoretically be an idealistic method, the practice of such process would generally result in a substantial cost increase of the slit products, thus making it unpracticable from the economical viewpoint.

It is generally known that the burrs would trend to grow greater as the cutting or slitting edges of the slit cutters become worn. In view of this fact, as an alternative countermeasure to such edge wear, it has been proposed to rationalize a regrinding line or procedure for the worn edges in parallel so as to meet a cost increase trend and provide burr-less slit products, or provide a cutter having a high resistance against mechanical abrasion so as to reduce cutter edge wear to a minimum. The former proposition wherein, for instance, there is provided twin slitter stands, would involve such time-consuming jobs of dismantling and reassembly of the cutter, and regrinding the cutter edges, consequently again resulting in a substantial cost increase. As the latter proposition, there is an example of the use of superhard cutters, however, such cutters would tend to be very expensive, and furthermore, there would possibly occur the problem of pitching or the like during operation. In conclusion, any of the propositions as stated above are attributed from the presumption that the burrs are formed inevitably during cutting or slitting operation, which should be deemed to be a countermeasure having a negative, passive and improper reasoning.

On the other hand, there is proposed recently an improved method and apparatus for eliminating or preventing the burr generation per se during the cutting or slitting operation of the coil stock, the detail of which is, for instance, to be referred to the German Pat. No. 1,806,305 (British Pat. No. 1,232,532), for further detail, reference is made to "Profile Glatter Schnittflaechen und gradfrier Kanten", No. 8, BLECH, Rohre, 1970, and to "Contergeschnittener Bandstahl", No. 4, 1972.

In this prior art defined as "counter cutting" according to the German Patent stated in the above, there are provided a second pair or cutter rolls in addition to and adjacent to a first set of cutter rolls, whereby the relative axial displacement of the first pair of cutter rolls to the second pair of cutter rolls is such that the penetration of the slit product or strip given by the first pair of cutter rolls is invertedly repenetrated by the second pair of cutter rolls, thus severing the original rolled material to a plurality of slit products or strips. In further detail, the general arrangement of the prior art apparatus is such that the first pair of cutter rolls are adapted to shear or slit the moving rolled material by a first shearing action along a line so as to cut only partially a first part of the rolled material from the second part thereof along the line in a vertical direction, and the second pair of cutter rolls are adapted to again shear or slit thus partially cut part of the rolled material yet in an inverted or opposite direction to the given cutting or slitting direction of the first shearing action along the same line, thus severing completely the first part from the second part of the rolled material along the above mentioned line. The most advantageous feature of this prior art is to provide a slit product having no burrs in a continuous line of production. However, as apparent from the foregoing description on the prior art apparatus, the number of cutter rolls or discs is naturally doubled compared with the conventional slitting machine arrangement, and consequently, there would be involved substantially more work in maintenance procedures such as exchanging, corrective regrinding, and realignment of the cutter rolls or discs in comparison with the conventional slitting machine. Strictly speaking, for the success of such an arrangement according to the prior art, it is essential to keep the alignment of the axes of the two pairs of the cutter rolls in extra precision, and also it is required that the guide devices for the rolled material should be maintained to operate in extra precision. In consideration of such specific arrangement, it is essential to meet a very high severity or precision in the design and manufacture of the slitting stand proper and all the components pertinent thereto, as well as in the daily operation and maintenance services. Consequently, it is inevitable that the production cost of the slitting machine of such a specific arrangement become twice or three times as much as of the conventional arrangement having a similar production capacity.

In consideration of the disadvantages inherent to the prior art such as stated hereinbefore, it would be advantageous if an improvement of such approaches in an attempt to solve the problem of burrs formation during the continuous cutting or slitting operations of the rolled material or coil stock be realized and made available without any substantial increase in the initial investment, or without addition of difficulties in the operation and maintenance of the cutting or slitting machine. This invention is essentially directed to meet such requirements as stated above.

It is therefore a primary object of the present invention to provide an improved method and apparatus for performing a burr-free cutting or slitting of the rolled materials of a metal such as iron, steel or nonferrous metal, or non-metals, which is essentially intended to in principle prevent any burrs from being formed during the continuous cutting operation, yet which is available with substantially the same initial investment and running cost as compared with the conventional slitting machine.

It is another object of the present invention to provide an improved method for performing a burr-free cutting or slitting of the rolled materials, which is essentially intended to in principle prevent any burrs from being formed during the continuous cutting operation, yet which is made available relatively readily by modifying only a part of the existing conventional slitting machine and at a relatively low cost.

It is a further object of the present invention to provide an improved apparatus for performing a burr-free cutting or slitting of the rolled materials, which is essentially intended to in principle prevent any burrs from being formed during the continuous cutting operation, yet which can be produced with substantially the same initial investment and operated with substantially the same running cost.

According to this invention, briefly summarized by way of a preferred embodiment thereof, there is provided an improvement in the method of cutting or slitting of rolled materials of metal such as iron, steel or nonferrous metal, or a mon-metal, in a continuous operating condition to provide a plurality of cut or slit strips free from any burrs otherwise formed during the slitting operation, which comprises the steps of preliminarily and selectively determining control factors of cutting rolls or discs such as an overlap and a clearance (which factors are to be defined hereinafter) at specified levels, respectively, feeding the rolled material now in uncoiled flat fashion between the spacing of a first pair of cutting rolls or discs of the conventional arrangement having the above mentioned predetermined settings, subjecting the flat uncoiled material or strip of original width to a first action of shearing by the first pair of cutting of slitting rolls or discs to an only partially sheared yet unparted form of a plurality of strips having predetermined individual breadths along a given longitudinal line, further feeding a thus formed plurality of strips in partially sheared yet unparted form between the spacing of a second pair of flattening rolls predetermined to a gap substantially equal to a thickness of the strip material, and subjecting thus partially sheared or penetrated strip material to a second action of flattening by the second pair of flattening or press-down rolls so that the strip material parts thus partially sheared in a given direction is then flattened or forced back to the thickness of the strip material in a flat state, whereby the partially sheared strip material can be severed completely from the adjacent parts along the line of given breadth, with any burrs being prevented from occurring during the slitting operation.

According to one aspect of the improved cutting or slitting method of this invention, there is made available a slit product having no burrs otherwise formed during the slitting operation by feeding the flat material through a line of slitting operation which comprises a slitting stand and a roll stand having substantially the same load capacity as that of the slitting stand and disposed integrally or separately in alignment therewith and in the downstream side thereof, thus performing the cutting or slitting operation.

According to another aspect of the present invention, further briefly summarized by way of another embodiment thereof, the above mentioned burr-free slitting machine comprises a slitting stand and a flattening roll stand arranged in series or tandem alignment with each other, wherein the slitting stand is provided with at least one pair of cutter discs having a cylindrical or frusto-conical configuration in cross section on a pair of twin shafts being disposed in vertically parallel relationship with each other, and there are two operating factors of "overlap" and "clearance" with respect to the adjustment of the pair of slitting or cutting discs (these operating factors being defined hereinafter) of the slitting stand. The opposing pair of cutting discs are adjusted with suitable overlap and clearance values being set with each within a selectively predetermined range. The shafts on which the above mentioned cutting discs are securely mounted are supported rotatably freely or drivably with power. The other part of the slitting machine, i.e., the flattening roll stand comprises an opposing pair of rolls having cylindrical smooth surfaces and disposed in vertically parallel relationship with each other, which opposing pair of rolls can be adjusted with the spacing therebetween within a selectively predetermined range of distance and are supported freely rotatably or drivably with power. As mentioned hereinbefore, the flattening or press-down roll stand is disposed in the downstream of the above mentioned slitting stand as viewed from the moving direction of the strip material to be slit.

According to a further aspect of the present invention, there is made available a slit product free from any burrs from any rolled materials of such as metals or non-metals, irrespective of their factors such as thickness, breadth, number of strips to be slit to, breadth of strip to be slit, only if the operating factors such as an overlap and a clearance of the cutting discs in the slitting stand are selectively predetermined within an optimal range.

By virtue of the advantageous feature that the slit product obtained from the method according to the present invention has no burrs formed, in principle, during the cutting or slitting operation as further described hereinafter, it is natural that the thus obtained slit product is proved to be advantageously superior in the quality to that obtained from the conventional slitting method and apparatus in which burrs were inevitably formed. At the same time, in consideration of the fact that there are substantially same number of component elements in the two slitting machines, the conventional one and the one of this invention, and that substantially same procedures are involved in the ordinary slitting operation of the two slitting machines, it is apparent that the initial investment and operational labor cost would more or less turn out to be substantially same, irrespective of the outstanding advantageous features made available from the present invention over the conventional method and apparatus. In addition, however, even in comparison with the aforementioned counter cut method, it is also apparent that the method and apparatus according to the present invention can be reduced to practice with a far less running cost when viewed from the economical standpoint of the maintenance services, including parts cost and labor cost involved in the dismantling and exchanging of cutter discs as well as complex yet delicate realignment thereof in daily duty.

The nature, principle, and details of the present invention, as well as further objects and advantages thereof, will become more apparent from the following detailed description with respect to the preferred embodiments of the invention when read in conjunction with the accompanying drawings, in which like parts are designated with like reference numerals.

In the drawing;

FIGS. 5A and 5B are schematic views showing the operating principle of the multiple slitting operation according to this invention;

FIGS. 7A and 7B are graphic representation showing a successful overlap area wherein the slitting method according to this invention is successful;

FIG. 8B is a graphic representation showing a successful area plotted with respect to the clearance value relative to the thickness of the flat material;

FIGS. 9 through 14 are schematic views showing a variety of preferred embodiments of the slitting machine according to this invention;

In conjunction with the accompanying drawings, description is now to be given in detail on the preferred embodiments, for illustrative purpose only but not in any way for limitation, of the slitting machine according to this invention.

Figure 1A:
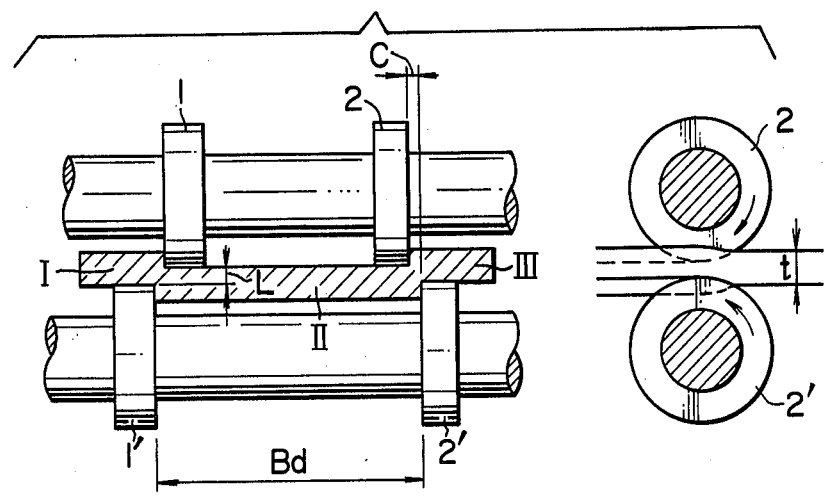
FIGS. 1A through 1C are schematic views showing the operating principle of the slitting method and apparatus according to this invention.
Figure 1B:
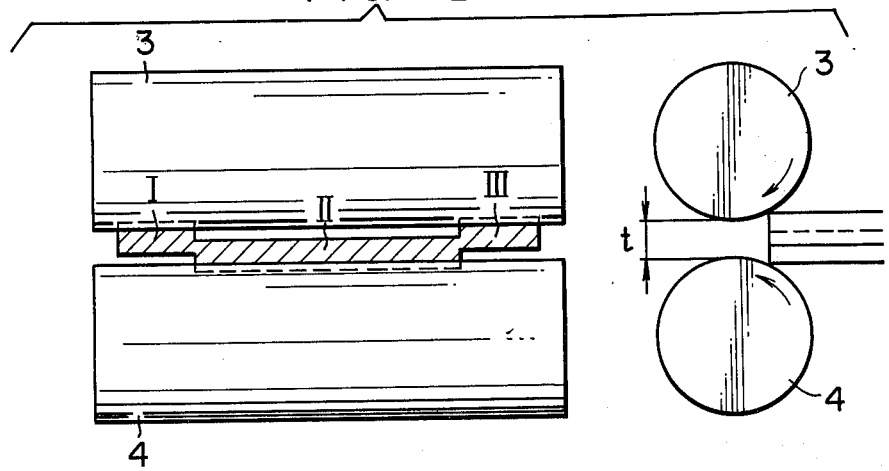

Referring now to FIGS. 1A and 1B, there is shown, in schematic view, the principle of the slitting method according to this invention. FIG. 1A illustrates a step of partially-shearing or "penetration" of a raw flat material by engaging function of two pairs of cutter discs in a slitting stand, which cutter discs are of a cylindrical configuration and disposed rotatably on a pair of parallel shafts, an opposing pair of cutter discs being arranged in opposing relationship with each other with a spacing therebetween, thus rendering a "penetration" against the surfaces of the raw flat material to be cut or slit by the slitting stand. For clarity of the description herein, the raw flat material is separately designated with the reference numerals I, II and III to hypothetically show three strip parts to be slit in this exemplary description. The raw flat material or blank to be slit is shown to be forcibly indented or penetrated between an opposing pair of an upper cutter disc 1 and a lower cutter disc 1', and between another pair of an upper cutter disc 2 and a lower cutter disc 2', respectively, according to a predetermined mutual arrangement of the cutter discs with such operating factors thereof as "overlap" and "clearance".

The term "overlap", designated with the reference character "L" herein, is defined herein to mean a vertical gap or distance between the outer circumferential faces of an opposing pair of cutter discs, 1 and 2, or 1' and 2' as viewed in FIG. 1A, which is the depth or degree of interference of the cutter discs with the flat material, thus providing a desired partially-sheared or penetrated state thereof when passing the flat material through the opposing pair of cutter discs, and which is represented with a minus value when each pair of the upper and lower cutter discs are set apart or away from each other in the vertical direction, while the same is of a plus value when set in an overlapping relationship with each other in the vertical direction. The term "clearance" is used herein to mean a lateral distance defined between the opposing side surfaces of the engaging pair of cutter discs, as designated with the character "C" in FIG. 1A, and which is represented with a plus value with the opposing side surfaces of the two cutter discs are parted away or outwardly from each other in the lateral direction, while it is represented with a minus value when the opposing surfaces of the two cutter discs are interposed inwardly or in an overlapping relationship with each other in the lateral direction.

Figure 2:
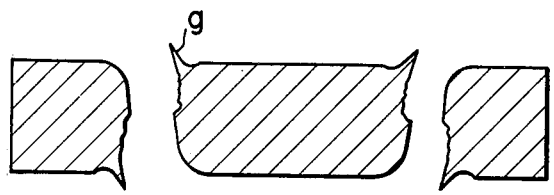
FIG. 2 is a cross sectional view showing the aspect of burrs formed in a slit product obtained from the prior art.

With such an engagement relationship exists between the flat material or blank to be slit and the two opposing pairs of cutter discs as viewed in FIG. 1A, as an initial setting value of the overlap "L" between the opposing pairs of cutter discs varies toward a plus or positive value area, the deformed area of the blank comes to yield in excess of its marginal plastic deformability finally at a certain overlap value L which depends on a plastic deformability of the blank and a clearance C value, and then there occurs cracking from the areas of the deformed portions adjacent the edge portions of the cutter discs, thus causing the deformed portions of the blank II to be severed from its adjacent deformed portions of the blank I and III with the cracks grown therethrough. Such a slitting working was conducted with the combination of the values of L and C set in the prior art slitting operations. In such a slitting operation, however, owing to the fact, as pointed out by Crasemann, that the above mentioned cracking occurs from the lateral sides of, yet not from the areas substantially at the cutter disc edges, it is understood to be inevitable that there would be formed so-called "burrs" in the cut-off edge areas of the blank trailing in the direction of slitting. (Refer to the burrs designated with "g" in FIG. 2) Since such burr formation is due to such a cracking generated in the lateral or side surfaces of the cutter discs and such separation of the blank areas due to such cracking, it is essential to prevent such cracking from occurring or provide for some effective measures prior to occurrence of such cracking in order to prevent such burrs from being formed in the slitting operation.

Figure 1C:
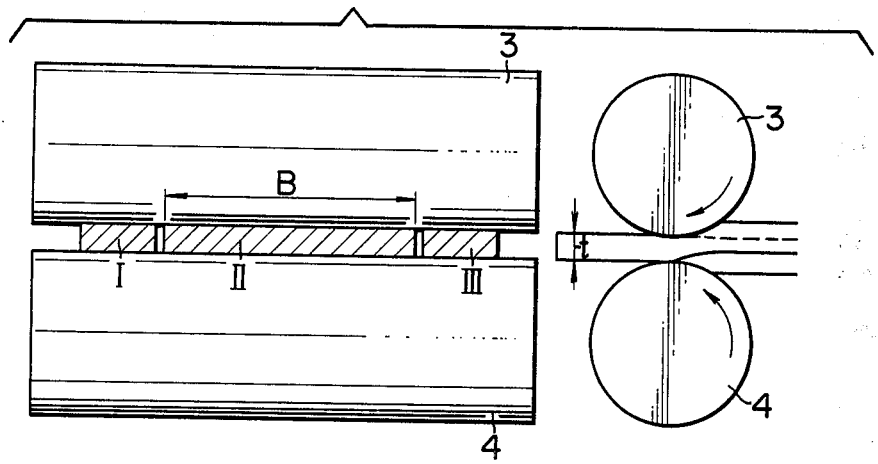
Figure 3:
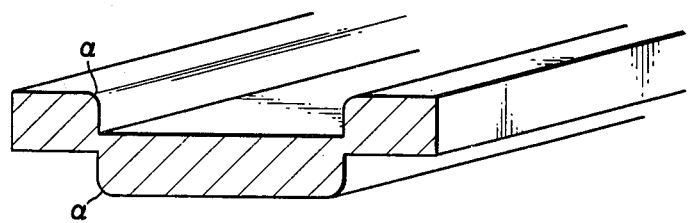
FIG. 3 is a perspective view showing a partially sheared material obtained at the step of passing through the first slitting stand.

According to an improved method of this invention, values of overlap L and clearance C are selectively predetermined at such an order that prevents or does not cause the growth of such cracking or parting in the deformed areas of the blank in the first stage of partially-shearing or penetration of the blank at the slitting stand of this invention. In this step, it is preferable to select a value C which enables a cut-off or fracture path of the blank to define the smallest possible angle of inclination with respect to the vertical direction, designated at $\theta$ in FIG. 4E in order to obtain as optimal as possible a state of the cut-off or fracture face of the blank as is further described hereinafter. With respect to the value of overlap L, it is essential to select a value which assures a severing or cut-off of the blanks into a plurality of strips only at the second step of the slitting operation according to this invention, which is also to be described hereinafter. An optimal combination of these values L and C would vary with a kind of material to be handled, which is also to be discussed in detail according to the experimental data. In FIG. 3, there is shown an exemplary state of a partially-sheared or penetrated blank by the opposing pairs of cutter discs of the slitting stand in the above mentioned first stage of shearing action, wherein there exist shear droops $\alpha$ in the outer edge corners of each path of partial-shearing or penetration as viewed in FIG. 3. Following the above mentioned step of partial-shearing or penetration of the blank with the central part II thereof being displaced in the vertical direction with respect to the remaining adjacent parts I and III, the blank is then fed forcibly into the spacing defined between the opposing pair of press-down or flattening rolls 3 and 4 in the flattening roll stand as viewed in FIG. 1B. When passing through the spacing between the pair of press-down rolls 3, 4 the central part II of the blank protruded vertically from the plane of the remaining adjacent parts I and III is caused to be pressed back in the opposite direction of such penetration formed in the first step of action in the slitting stand so as to be completely severed or parted into three pieces of slit products I, II and III, as shown in FIG. 1C.

Figure 4A:
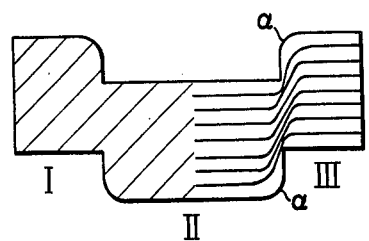
FIGS. 4A through 4E are views, in cross section, showing the progressive steps of slitting operation in sequence according to this invention in which there is produced a burr-free slit product.
Figure 4D:
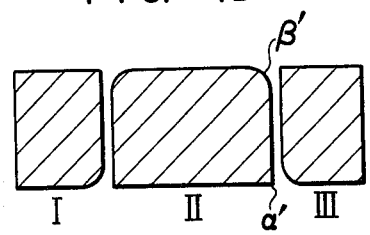
Figure 4B:
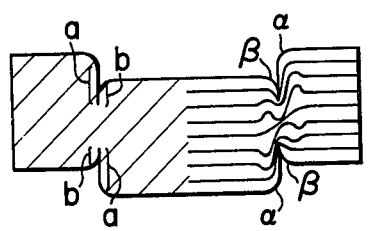
Figure 4E:
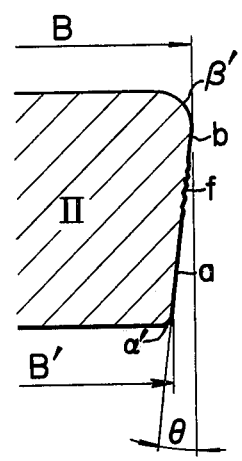
Figure 4C:
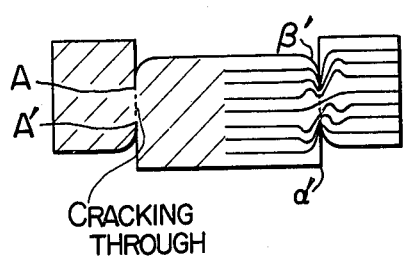

Referring now to FIGS. 4A through 4E, the blank is shown to be deformed in penetration by the cutter discs 1 and 2 arranged in vertically opposing relationship wherein the deformed areas of the blank are still in an unparted state (FIG. 4A), then the blank is shown in a state of partial engagement between the press-down rolls 3 and 4 in the flattening roll stand wherein sheared-off faces a are in the slitting line of the blank, while formed are burnished faces b in the areas adjacent the above mentioned sheared-off faces a in opposed relationship with each other. As thus partially-sheared blank is driven into the spacing between the press-down rolls 3, 4, the shear droops $\alpha$ formed in the outer corner edges of the blank are caused to be diminished such as $\alpha'$ due to the progress of pressing-down effect of the rolls 3, 4, there is growingly formed new shear droops $\beta$ on an opposite outer corner edges to these where the droops $\alpha$ lied, as the degree of engagement with the rolls 3, 4 progressively increases. Also in FIG. 4C, there is shown the blank which came to engage further with the press-down rolls 3, 4, wherein the plastic deformability of the blank comes to an extremity during the pressing-down operation, and then cracking occurs from the leading ends A, A' of the deformed areas of the blank, then growing further to an extent where there is finally provided communication between thus formed cracking growing from the initial points A, A', whereupon the blank thus partially-sheared is now parted into the final slit products I, II and III as viewed in FIGS. 4D. In FIG. 4E, in which further detail of a cut-off face of the slit product II, there is shown an aspect of the cut-off face of the product where there are formed a small droop $\alpha'$ and a fracture surface generated between the sheared-off face a and the burnished face b, yet having no burrs formed at all. It should be noted that the shear droop $\alpha$ formed at the step of partially-shearing now becomes substantially smaller in the final slit product, while there occurs in contrast a relatively large droop $\beta$ during the second pressing-down or flattening step of the slitting operation, as best seen in FIG. 4E. As fully explained in the foregoing, the thus obtained slit product according to this invention differs from the slit product obtained from the prior art counter cut method mentioned hereinbefore in that there are formed two shear droops, one is relatively large and the other is relatively small, in the upper and lower corner edges of the final product. In the case of the slit product obtained from the above mentioned prior art, there appear two appreciable droops in the corner edges thereof.

Referring to FIGS. 5A and 5B, there are schematically shown the principle of the present invention which is reduced to practice of a so-called multiple slitting operation and which is adapted to produce burr-free slit products, as is apparent from the foregoing description in conjunction with FIGS. 4A through 4E.

Hereinafter, description will now be made for the determination of optimal values of overlap (L) and clearance (C) to be applied in the first step of partial-shearing or slitting as stated hereinbefore according to the results of a series of experiments undertaken by the inventor of this invention.

SELECTION OF OVERLAP VALUE (L)

Figure 6:
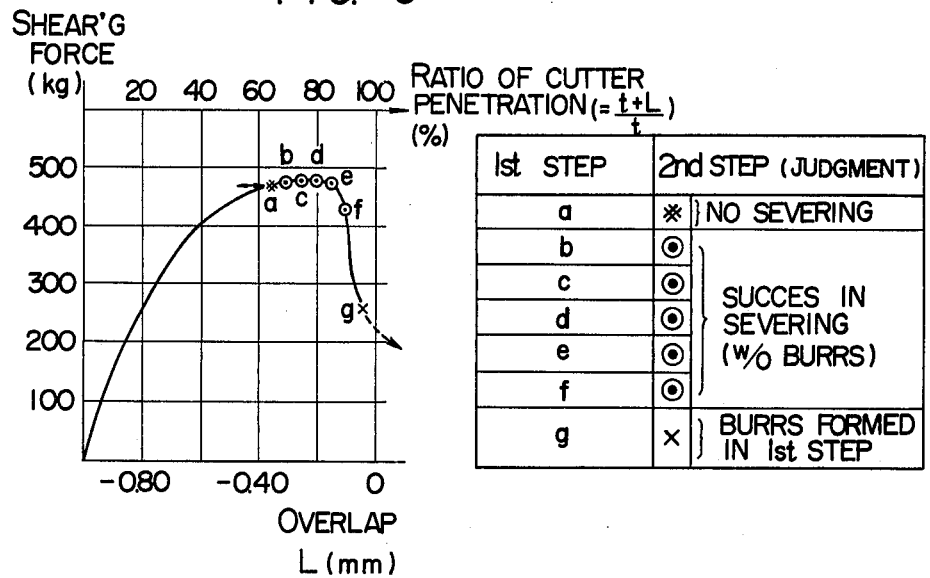
FIG. 6 is a graphic representation showing the relationship between slitting (shearing) forces and final shearing points in the first slitting process.

Firstly, in order to learn the general trend of the effect of the overlap L in the first step of the slitting operation, a series of tests were conducted on a coil of soft steel, for instance, processed with side trimming priorly, the results of which were plotted with down-pressing forces to effect the partial-shearing on the ordinate and with the overlap values on the abscissa in FIG. 6. On this chart, there are selected seven points a, b, c, d, e, f, and g plotting each of the pressing forces effecting the partially shearing operation, with the point d being a maximum value.

In the tests, a soft steel test strip was given penetrations with several overlap values corresponding to each of given points a, b, c, d, e, f, and g, with the point d having a maximum pressing force, as a first step of the slitting operation, and then the test strip was subjected to pressing back force of the press-down or flattening rolls having a diameter of 245 mm and a roll gap set at "t" as a second step of the operation, in order to observe a success of the method according to this invention. As seen in the chart, the results are that if the first step of slitting operation is conducted with its load condition lying in the proximity of the maximum point of pressing force, there occurred no burrs in the cut-off edges of the test strip, which was slit into three sections I, II and III after passing through the second step of flattening operation in the flattening roll stand, thus proving the test succeeded. It is now known that the shear deformation (strain) in the first step was an extent of strain where a shearing force in the proximity of a maximum shearing stress point which could have been given to the test strip.

FIGS. 7A and 7B show further apparently the characteristics in the range of overlap in which the method according to this invention succeeded. In this particular series test, a slitting machine of pull-cut type was used. It was found that the overlap value L in the first step of the slitting operation lay in the range where the press-down or pulling forces were less than its peak value. This trend means the fact that cracking should have occurred during the second step of slitting operation, i.e., the flattening step in order to obtain success in the slitting method according to this invention, that is, in other words, to support that the press-down force or flattening force would naturally have fallen to a low level when there occurred cracking during the second step.

SELECTION OF CLEARANCE VALUE (C)

Figure 8A:
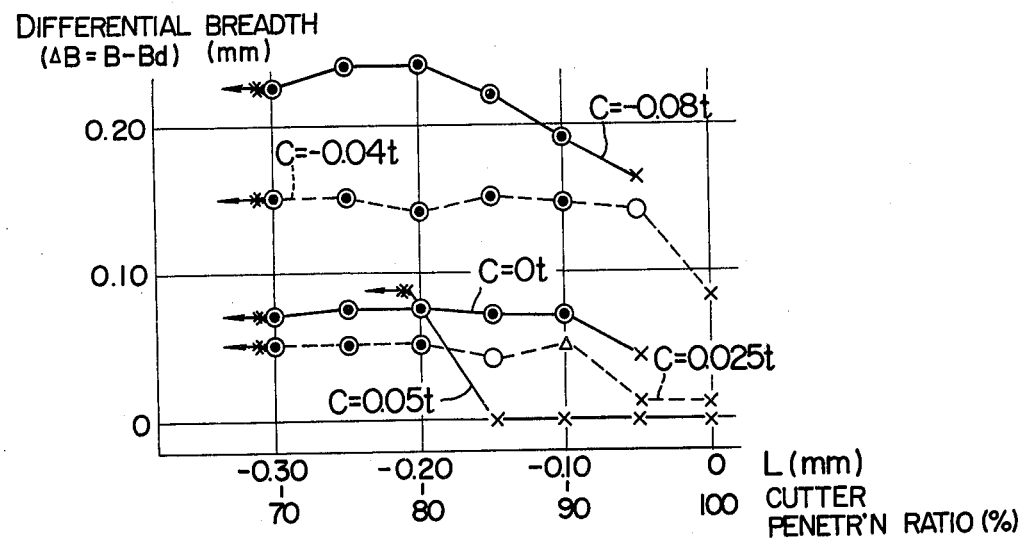
FIG. 8A is a graphic representation showing the effect of a clearance selected in the method according to this invention.

In order to learn that the general trend of the effect of the clearance value C in the first step of slitting operation, five different relative clearance values C of 5, 2.5, 0, −4, and −8% to the thickness t of the test strip were applied on the same material, in which the thickness is 1 mm, during this test. At the same time, checking was made for a differential in the breadth ΔB of the slit product, the results of which were given in FIG. 8. In the chart, there are used such designations; represents a good cut-off face without burrs formed, for a fair cut-off face without burrs but with poor or less smoother fracture face than a good cut-off face, and Δ for a poor cut-off face clearly parted but with certain burrs in the second step, which is deemed to be unsuccessful. However, the burrs in this case were found smaller substantially than the case of unsuccess marked with x. As is suggested in FIG. 8A, it was noted that too large clearance C value would bring no success of slitting operation without burrs, regardless of any suitable overlap value L in the first step of operation. This matter was further studied, and the results of which were shown in FIG. 8B. The purpose of the test was to further study the effect of clearance value C on the area wherein the slitting operation turned out to be successful (the area surrounded with thick lines in FIG. 8B), and to make certain whether the clearance value questionable in this respect is of an absolute value or of a relative value to a thickness of a flat material to be slit in the operation. From the results of the test, it was found that a marginal clearance for successful slitting is of a relative clearance value with respect to the thickness of a test material as seen from the trend of FIG. 8B wherein a clearance value of 5% is a marginal value where the slitting operation turned out to be successful, and this fact is true with either a thickness of 1 mm or 3.2 mm of the test material. Also, it was generally seen that as the overlap value grows in the negative direction, the overlap area wherein the slitting operation turned out to be successful is increasing. As shown in FIG. 8A, when the clearance value grows in the negative direction, there grows greater a differential ΔB between the breadth B of the slit product II and the cutter disc spacing Bd on the side where the slit product was to be inserted (See FIG. 4E, in this test, Bd=2C+17.9 mm). This trend means that, judging from the fact that the value Bd corresponds generally to the value B' of FIG. 4E, as the clearance C grows in the negative direction, the angle θ grows greater, thus resulting in a poor right-angledness in the cut-off face. Consequently, in this slitting operation, it is preferred, in consideration of the precision required in the slit product, to set the clearance value C at the zero point or near there (positive or negative). With such zero point setting of the clearance value, it is advantageous in practice in that the number of spacers and shims required for such adjustment could be reduced, which would substantially contributes to the rationalization and the operability of the slitting machine.

Although the above mentioned data are obtained from the series of experiments worked on soft steel, identical results are obtained in the case of plastic working using such metals as stainless steel, brass, copper, aluminium, etc. as well as non-metal materials such as plastic resins, which naturally means that the fact that soft steel experimented with turns out to be true with the case of a variety of materials.

In the series of tests as stated hereinbefore, the opposing pair of press-down or flattening rolls are spaced with a gap substantially corresponding to the thickness of the flat material to be slit in the operation, however, it is not essential to strictly set the roll gap equal to the thickness of the material handled. When making the roll gap smaller than the material's thickness, there would occur a rolling press effect on the material surface, which effects to turn a dull surface to a bright surface of the slit product due to a skin pass effect. This is one of advantageous features of the method according to this invention.

Furthermore, according to this invention, in the first step of the slitting operation, it is very easy to guide the flanks of the partially-sheared or penetrated blank during its transfer to the flattening step, as it is not yet clearly parted or separated, thus effecting to prevent any camber of the blank from occurring. This is to contribute to the improvement of product quality, and is another advantageous feature derivative from this invention.

Figure 15A:
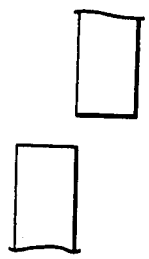
FIGS. 15A through 15C are fragmentary cross sectional views showing the variations of cutter disc edges of the cutter discs disposed in counter-engaging relationship with each other.
Figure 15B:
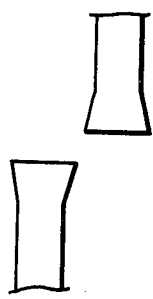
Figure 15C:
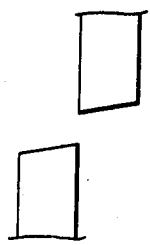

FIGS. 15A through 15C are fragmentary views of the cutter edges of the opposing pair of cutter discs which are incorporated in the slitting stand for effecting the first step of partially-shearing operation according to this invention. The cutter edges shown in FIG. 15A are of a most common disc type, and variations are of such as having a frusto-conical shape edge in cross-section as shown in FIG. 15B, and of a inclined or bevelled edge surface as shown in FIG. 15C.

Figure 16:
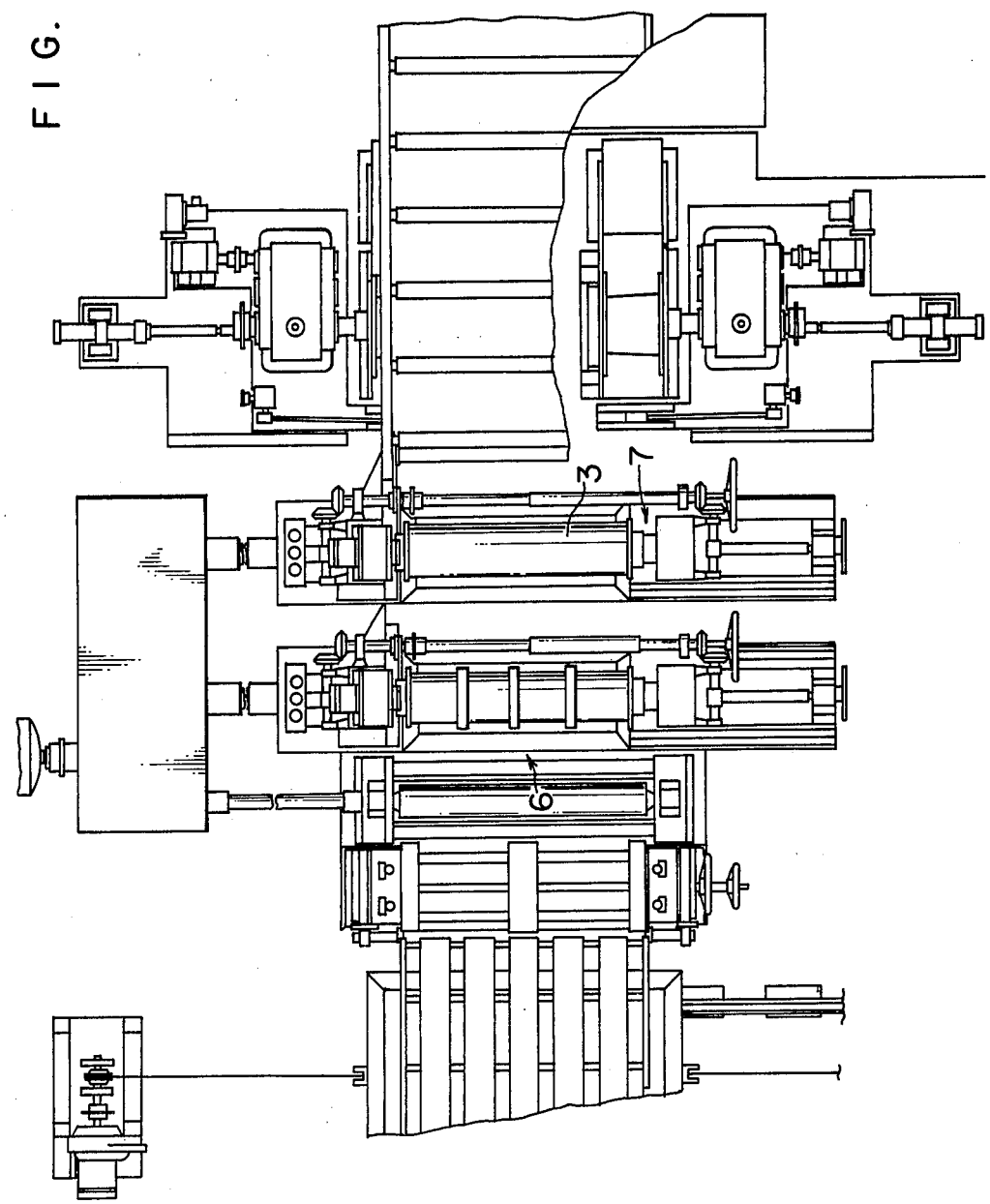
FIG. 16 is a top plan view showing the general arrangement of the slitting machine according to this invention.

FIG. 16 is a top plan view showing generally the installation of the slitting machine according to this invention, in which the slitting operation line is driven by a single prime mover through a geared system to drive the both slitting and flattening stands. These individual stands may of course be driven by its own prime movers, respectively, in synchronism.

FIGS. 9 through 14 are schematic views showing a variety of embodiments of the slitting machine arrangement according to this invention, among which there are shown only a minimum of the components which are essential to the practice of the slitting operation according to this invention. In actual arrangement, however, there are of course many other attachments and accessories to perform the specific requirements to various operating performances of the slitting machine. As these attachments and accessories are well known in the field to which this invention relates, there will be no further description given herein about them.

In FIG. 9, there is shown an example of slitting machine arrangement wherein the slitting operation is embodied in a slitting machine of so-called pull-cut type. In the figure, shown are an uncoiler 5 for uncoiling a strip of flat material to be slit, a slitting stand 6 for partially-shearing or penetrating the strip material to be fed thereto, a press-down roll stand 7 for flattening the partially-sheared strip material back to a flat state, a recoiler 8 for recoiling the slit product, and a device for giving a drawing tension to the strip material to be recoiled such as a tension pad stand 9. The reference characters M1 through M4 represent prime movers for driving each of the component stands, respectively, which prime movers are of course operatively connected to the individual components through suitable power transmission means and control means. In the drawing figures following, like parts are designated with like reference numerals for clarity of explanation.

In operation, the slitting machine shown in FIG. 9 is operated in such a manner that the coil stock uncoiled from the uncoiler 5 is directed into the slitting stand 6 so as to be partially-sheared or penetrated to an extent of not being parted clearly, i.e., in a state as shown in FIG. 3, by the opposing pair of slitting rolls or cutter discs 1, 1' and 2, 2', and then redirected toward the press-down roll stand 7. At this moment, the power to the slitting stand 6 is once stopped so that the slitting rolls or cutter discs can be rotated freely, and then by switching on the prime mover M3 of the flattening roll stand 7, the stand 7 now engages with the partially-sheared material and forces it to be pressed down to its original thickness while passing forwardly therethrough. After passing through the stand 7, the completely slit product is now directed into the recoiler 8 through the tension pad 9 so as to be recoiled on the recoiler drum under a suitable tension controlled by the tension pad. When the leading end of the slit product is captured properly in the engaging slot on the recoiler drum, the power to the press-down stand 7 and the uncoiler 5 was cut off, so that the press-down rolls can be rotated freely. With such procedures, a threading procedure prior to the start of slitting operation is completed, and then a continuous slitting operation is now ready. When switching on the prime mover M4 of the recoiler 8 so as to give a tension to the strip of material, a regular continuous slitting operation of so-called pull-cut type is now run. In this operation, it should be noted that the slit product having no burrs is obtained through the processes at and following the press-down or flattening roll stand 7.

It should also be noted that this invention can be practiced advantageously in the so-called "pull-and-drive-cut" by those skilled in the art, wherein, in operation, after threading procedure is completed, the slitting stand cutter discs are set in reengagement with the strip material, the slitting rolls or cutter discs are subjected to the strip material under a suitable tension given by the recoiler and the tension pad, and then the prime movers M2 and M4 are driven in synchronism so that a passing speed of the strip material through the slitting stand 6 and the recoiler 8 may be equal.

FIG. 10 shows a modification of the slitting machine shown in FIG. 9, wherein there is provided the press-down roll stand 7 immediately adjacent the recoiler 8, and there is no tension pad stand therebetween. In this modified arrangement, a back tension for recoiling the strip material or slit product is given from the summation of a pulling force P1 required for partially shearing the strip material at the slitting stand 6 and a pulling force P2 required for flattening the partially sheared material at the press-down roll stand 7. By this means, as the press-down roll stand 7 can provide for the both effects of pressing-back and tensioning at the same time, thus eliminating the need of the tension pad stand, which can contribute to an arrangement to curtail the overall length of the line of production. Also in the arrangement shown in FIG. 9, an additional recoiling back tension factor is provided at the press-down roll stand 7, and therefore, it is possible to cut short of the pressing force rendered by the tension pad to an extent of that additional tension factor provided by the roll stand 7. Consequently, in the slitting machine arrangement according to this invention, there is less chance of bringing flaws or scratches on the surface of the slit product, which would otherwise have occurred under the conventional heavy pressing forces effected by the tension pad. This effect would increasingly be appreciated particularly when the thickness of coil stock increases, thus requiring a greater back tension.

When the machine shown in FIG. 9 is to be operated under the "pull-and-drive-cut" and is applied as a side trimming unit, the press-down roll stand 7 can now be operated as a rolling stand, thus it is possible to use it as a dual-purpose work line, which would substantially contribute to the savings in the cost and space in the industrial plant planning. In such operation, it is naturally essential to carry a synchronous speed control among the prime movers M2, M3 and M4 in order to prevent a slack in the coil stock passing through the individual stands from occurring.

FIG. 11 shows another modification of the machine arrangement shown in FIG. 9, in which modification there is provided an integral arrangement of the slitting rolls or cutter discs 1, 1' and 2, 2' and the press-down rolls 3, 4 incorporated in a single stand, thus forming a slitting and flattening stand 10 of an integral construction. In such arrangement, the drive control method provided for the cutter discs and the press-down rolls varies whether the slitting stand section is operated in the pull-cut phase or in the pull-and-drive-cut phase. In the case of the latter phase, it is essential to control the driving operation so that there is no slack of the material between the cutter discs and the press-down rolls. In either operation phase, it is possible to shorten the overall length of the slitting line by adoption of the integral stand construction.

FIG. 12 shows an example of the slitting machine arrangement which is a so-called "drive-cut" system wherein the present invention is embodied. In operation, the coil stock uncoiled from the uncoiler 5 is firstly threaded through a first looper, not shown, to the slitting stand 6 wherein a partial shearing in an unparted state is provided in the strip material as shown in FIG. 3, and then further moved through a second looper, not shown either, to the press-down roll stand 7 by temporary driving of the slitting stand. At this moment, the slitting stand 6 is stopped so that the cutter discs can be rotated freely, then the prime mover M3 of the roll stand 7 is driven to cause the partially sheared strip to be forced back substantially to its original thickness t, and the strip is further threaded through the tension pad 9 to the recoiler 8 till the leading end of the strip is engaged in the slot formed on the recoiler drum. While the tension pad is adjusted to press upon the strip with a suitable pressure, the second pair of looper tables is tilted downwardly, and the strip is given a loop to a predetermined extent in the second looping pit 12 by feeding function of the prime movers M1 and M2. Then the first pair of looper tables is tilted downwardly, and the strip is given a further loop to a predetermined extent into the first looping pit 11. With the rolls of the press-down roll stand disengaged so as to be rotatable freely, the threading procedure is completed. When the prime movers M1, M2 and M4 are driven at a synchronous speed so that the moving strip material speed is controlled constantly at any parts thereof, thus the extent of looping of the strip material in the looping pits 11 and 12 being kept in a constant shape, a regular continuous slitting operation is now ready. When the regular slitting operation is started, there is produced a burr-free slit product in the processes at and following the press-down roll stand 7. Although in the above description the rolls of the press-down roll stand 7 are left in a freely rotatable state after the threading of the strip material therethrough, it is also possible, as the case may be, put the prime mover M3 to be driven in synchronism with the operation of the other prime movers M1, M2 and M4. Furthermore, it is of course possible to arrange, as a modification, this embodiment in the manner of integral stand construction 10 as shown in FIG. 11 instead of the independent press-down roll stand 7. In such arrangement, it is naturally essential to operate the cutter discs and the press-down rolls in the integral stand 10 in synchronism.

FIG. 13 shows an example of a so-called "shear and slitting line" adapted to produce a multiplicity of strip sheets having specified dimensions from the raw wide coil stock on mass production scale, wherein this invention is embodied. In operation, the coil stock uncoiled from the uncoiler 5 is threaded through, for instance, a well-known loop control device 13 including limit switches therein, a first delivery roller device 14 driven by a prime mover M2, a shearing stand 15, and a second delivery roller device 16 driven by a prime mover M3, finally to an integral slitting and roll stand 10 as exemplarily shown in FIG. 11. When the shearing stand is operated, there is produced a sheet having a desired length. Thus obtained sheet material is directed through the roller device 16 to the stand 10, which are driven in synchronism, then it is subjected to slitting action so as to be slit into a shape of strips in the moving direction, and finally stored in a stack state in a store section 17.

FIG. 14 shows an example of a sheet slitter machine adapted to produce a multiplicity of strip sheets having a thin breadth from a sheet material of standard dimensions, wherein this invention is embodied. A sheet material of standard dimensions 19 on a guide table 18 is firstly subjected to the burr-less slitting operation in the slitting and roll stand 10 as shown in FIG. 11, and then thus obtained strips are placed onto a table 20 for inspection.

In the foregoing description, although there is further description on the speed control of the prime movers incorporated in the slitting and roll stand, this control naturally belongs to the specific technical field as well known by those skilled in the art.

According to the present invention, the above mentioned press-down roll stand is also adapted to effect an ordinary rolling performance, which is naturally within the scope and spirit of the invention. In such performance, however, as it is only required that the press-down roll stand is simply to perform such a rolling operation as to press back the partially-sheared strip material to its original thickness, when compared with the ordinary rolling mill, such roll stand can merely be of a compact construction.

The smallest radius required for the opposing pair of the rolls adapted to induce a bite or engagement therebetween is found substantially same as that of the slitting cutter discs from a simple theometical formula, which is obtained from the parameters of a frictional coefficient between the cutter disc edges and the flat material. It is, however, possible to apply a pair of rolls having a far smaller radius than that obtained from the above mentioned formula, if and when the leading end of the partially sheared strip material is preliminarily pilotted or pressed back to its original thickness for aiding insertion into the spacing between the rolls. Also, as is apparent from the operational aspect of such rolls in the press-down roll stand, the alignment and working criteria of such rolls, as well as their finish standards, are not so strict in comparison with those of the slitting discs of the first slitting stand. In this respect, it is relatively easy for those skilled in the art to conduct such alignment work and adjustment in connection with the installation of the press-down roll stand of a relatively small and simple construction. Therefore, a modification of such a slitting machine existing in combination with an existing roll stand having such a design and construction as mentioned above falls well within the scope and spirit of the present invention.

It should be understood, as indicated hereinbefore, that the preferred embodiments as described and shown hereinbefore do not mean in any way limitations of this invention, but on the contrary, many changes, variations, and modifications with respect to the construction and arrangement in practice thereof may further be derived by those skilled in the art to which the present invention pertains, whereby the advantageous characteristics of this invention may be realized without departing from the spirit and scope of the invention as set forth hereinto in the appended claims.

What is claimed is:

1. The apparatus for cold cutting a strip of flat material which comprises, in combination, a pair of shaft means arranged in a parallel relationship with each other and extending in a transverse relationship with respect to the moving path of said flat material, at least one pair of opposing cutter disc means securely mounted in a coaxial relationship on said shaft means wherein the clearance defined between adjacent side faces of said opposing pair of cutter disc means is 0 to −10% of the thickness of said flat material, said opposing pair of cutter disc means being adapted to provide a shear force perpendicularly to the surfaces of said flat material along a longitudinal line parallel with the longitudinal edge of said flat material so as to provide a desired extent of shear strain in said flat material, thereby partially penetrating said flat material on a spot to be slit, and an opposing pair of rolls operatively coupled to said cutter disc means and disposed downstream of said opposing pair of cutter disc means in the direction of the moving path of said flat material, said rolls being mounted on a pair of parallel shaft means extending in a transverse relationship with respect to the moving path of said flat material, said opposing pair of rolls having cylindrical flat surfaces and selectively adapted to force back said partial penetration formed in said flat material substantially to the thickness of said flat material in a substantially flat state, whereby a continuous slitting operation is performed.

2. A method of cold cutting a strip of flat material, said method comprising the steps of:
 (a) feeding said flat material to a first working zone;
 (b) subjecting said flat material to a first working action by an opposing pair of cutter disc means disposed in said first working zone to provide a shearing force thereto, wherein the clearance defined between adjacent side faces of said opposing pair of cutter disc means is 0% to −10% of the thickness of said flat material, said shearing force being perpendicular to the surface of said flat material along a longitudinal line parallel to the longitudinal edge of said flat material whereby a partial penetration is formed in said flat material;
 (c) feeding said partially penetrated material to a second working zone; and
 (d) passing said partially penetrated material through a predetermined spacing between a pair of opposed roller means disposed in said second working zone wherein said partially penetrated material is pressed in a direction opposite to the direction of said shear force by said roller means such that said partially penetrated material is returned to a flat material wherein said material is severed along said line of partial penetration such that said material is cut into strips without burrs on the edges thereof.

3. The method as claimed in claim 2, wherein said shear force is of a magnitude in the proximity of a maximul point of shear stress which is applicable to said strip of material.

4. The method as claimed in claim 2, wherein said flat material penetrated in said first working action is substantially rolled on the surface areas thereof.

5. The method as claimed in claim 2 wherein the clearance is 0%.

6. The method as claimed in claim 2 wherein the second working zone is independent from the first working zone.

7. The method as claimed in claim 2 wherein said second working zone is integral with said first working zone.

8. The method as claimed in claim 2 wherein said penetrated material is pressed to a thickness equal to the thickness of said flat material prior to said first working action.

9. The method as claimed in claim 5 wherein the depth of said partial penetration is in the range of 65 to 90% of the thickness of said flat material.

10. An apparatus for cold cutting a strip of flat material, said apparatus comprising:
 (a) first working means for providing a shearing force to said flat material in a direction perpendicular to said flat material along a longitudinal line parallel to the longitudinal edge of said flat material wherein said first working means comprises at least one pair of opposing cutter discs disposed on a pair of shafts extending parallel to each other and in a transverse relationship at right angles with respect to the moving path of said flat material, said opposing pair of cutter discs being arranged in such a manner that the cutter edges of said cutter discs are adapted to penetrate perpendicularly into the surface of said flat material, with a clearance defined between the cutter edges of said opposing pair of cutter discs being 0 to −10% of the thickness of said flat material, thereby applying said shear force thereto and thus forming said penetration therein; and
 (b) second working means for flattening said penetrated material by applying a force to the surface of said penetrated material in a direction opposite to said shearing force such that said penetrated material is returned to a flat material wherein said material is severed along said partial penetration whereby said material is cut into strips without burrs on the edges thereof.

11. The apparatus as claimed in claim 10, wherein said second working means comprises an opposing pair of rolls having cylindrical flat surfaces and disposed on a pair of shafts extending parallel to each other and in transverse relationship at right angles with respect to the moving path of said flat material.

12. The apparatus as claimed in claim 10, wherein said opposing pair of cutter discs in said first working means overlap in the direction perpendicular to the surface of the flat material to provide a shear force at a maximum shear stress point which is applicable to said flat material.

13. The apparatus as claimed in claim 10, wherein said first working means and said second working means are arranged within separate stands independently from and in a series relationship with each other.

14. The apparatus as claimed in claim 10, wherein said first working means and second working means are arranged integrally in a single stand.

15. The apparatus as claimed in claim 11, wherein said opposing pair of rolls in said second working means have a spacing therebetween substantially corresponding to the thickness of said flat material.

16. The apparatus as claimed in claim 11, wherein said opposing pair of rolls in said second working means have a spacing therebetween less than the thickness of said flat material so that the surface areas of said flat material may be rolled to a substantial extent.

17. The apparatus as claimed in claim 10 wherein the clearance is 0%.

18. The apparatus as claimed in claim 17 wherein the depth of said partial penetration is in the range of 65% to 90% of the thickness of said flat material.

* * * * *